Figure 1:
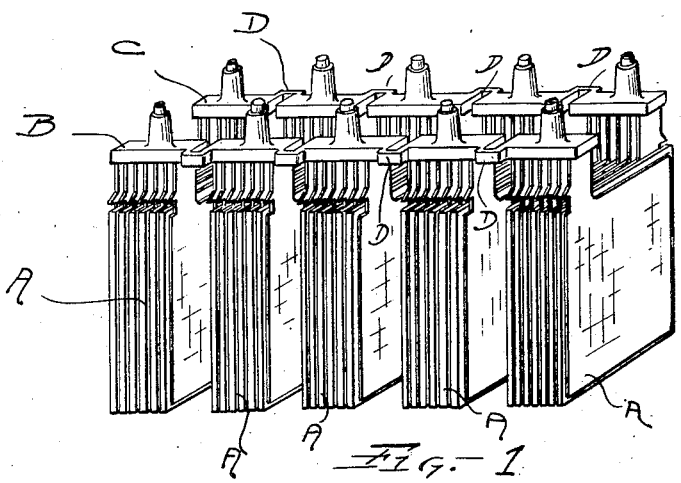

Dec. 25, 1923.

C. W. HAZELETT 1,478,786

METHOD OF ASSEMBLING STORAGE BATTERY ELEMENTS

Filed Jan. 24, 1922

INVENTOR
Clarence W. Hazelett
By Baker & Macklin
ATTORNEYS

Patented Dec. 25, 1923.

1,478,786

UNITED STATES PATENT OFFICE.

CLARENCE W. HAZELETT, OF LAKEWOOD, OHIO, ASSIGNOR TO THE HAZELETT STORAGE BATTERY COMPANY, OF CLEVELAND, OHIO, A CORPORATION OF OHIO.

METHOD OF ASSEMBLING STORAGE-BATTERY ELEMENTS.

Application filed January 24, 1922. Serial No. 531,386.

*To all whom it may concern:*

Be it known that I, CLARENCE W. HAZELETT, a citizen of the United States, residing at Lakewood, in the county of Cuyahoga and State of Ohio, have invented a certain new and useful Improvement in Methods of Assembling Storage-Battery Elements, of which the following is a full, clear, and exact description, reference being had to the accompanying drawings.

This invention relates to improvements in the manufacture of storage batteries and is directed to the provision of a novel method for the assembling of storage battery plates.

The general object of the invention is to provide a method wherein a series of storage battery elements may be assembled temporarily as one unit. By thus assembling a series of elements as a unit, the elements may be placed in electrolytic forming tanks and electrically connected without the expenditure of any greater amount of labor than has been required heretofore to connect one element in the forming tanks. It has been the general practice in most cases to place the plates or elements, each one as a unit, in the forming tanks and thereafter temporary weld electrical connections onto the bus bars of the respective elements; an operation both dangerous and uneconomical.

The specific purpose of my invention therefore, is to provide temporary connections between the bus bars of the respective elements which are autogenously welded to the bus bars when the bus bars are being welded to the battery plates; the connecting portions to be of such shape as to permit the expeditious removal thereof.

The foregoing objects will be set forth in the description of an embodiment of my invention as illustrated in the drawings, the essential characteristics being summarized in the claims.

Figure 2:
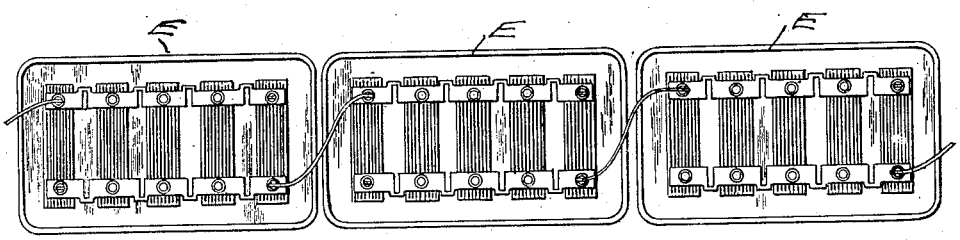
Figure 3:
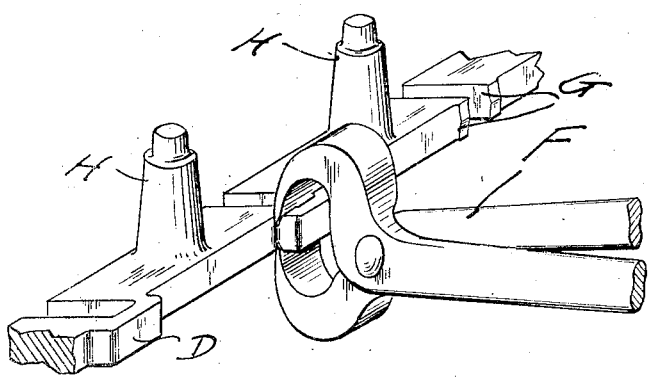

In the drawings, in Fig. 1, I have illustrated a group of storage battery elements in relative position, after the bus bars have been welded to the plates and terminal posts; while Fig. 2 is a plan view of a number of these groups of elements connected in series in individual electrolytic forming jars; Fig. 3 is an enlarged perspective view showing a simple means for severing the elements after they have been removed from the forming jars.

In the manufacture of storage battery elements it has been the practice heretofore to assemble the proper number of positive and negative plates, with suitable insulating separators therebetween, after which a molding frame was clamped about the battery plate lugs. The terminal posts, which are usually cast previous to this operation were then positioned in the mold and a bus bar was then formed by fusing a stick of lead into the mold cavity with an acetylene torch, thus autogenously welding the terminal post and battery lugs to the molten bus bar. After the solidification of the molten bus bar, the element was then placed in a forming jar containing a suitable electrolyte and a subsequent operation was then required to connect the positive and negative terminal posts of each element with the posts of an adjacent element positioned in another jar. This operation required the additional welding of connecting pieces onto the terminal posts.

I have found that considerable economy may be obtained by assembling a convenient number of elements in one operation, wherein the proper number of positive and negative plates may be grouped together to comprise a series of five or more elements. The terminal posts H may then be welded by casting the posts onto the plate lugs while during the same operation a suitable connection may be likewise cast between the bus bars. The operator thus handles five or more elements having possibly sixty plates where formerly he handled one plate at a time or at most one element of eleven plates.

In Fig. 1, I have shown a group of elements A, composed of the usual number of positive and negative plates having positive bus bars B and negative bus bars C joined by offset connecting portions D of sufficient size and cross section to insure proper conductivity of the current when the groups are being charged in the forming jars. I find that such a connection between the bus bars has sufficient rigidity to permit the convenient handling of the group as a unit when the elements are placed in and removed from the forming jars E.

A preferable form of connection between the bus bars may be obtained by having the temporary connecting portions offset.

A particular advantage in offsetting these connecting portions is that the elements may be more readily severed by the simple operation of cutting the connecting portion away by the use of an end cutting tool F such as is illustrated in Fig. 3, thus leaving the ends G of the bus bars in a smooth or finished condition.

I thus eliminate the dangerous and uneconomical operation of burning integral connections on the battery posts or plate lugs while the elements are positioned in the tank and I further eliminate the necessity of expending labor in cleaning solder from the terminal posts. By my method a greater number of elements may be assembled in a shorter period of time than heretofore, due to the expeditious manner in which the operator is enabled to handle a group of units where formerly he handled one at a time when placing them in the forming jars. Another very important advantage obtained in utilizing this method is that where formerly the conduction cross section of the connections made while the elements were disposed in the jars were often irregular, resulting in non-uniformity of the amount of current flowing into each battery element, it is now possible to obtain a series of connections between the battery elements which have the same degree of electrical conductivity. Hence, each positive and negative plate of each element is subjected to the same degree of electrolytic reaction with a consequent uniformity in the formation of each plate.

Having thus described my invention, I claim:—

1. The process of assembling a group of storage battery elements which includes the casting or welding of connecting portions between the element bus bars, electrically forming the element plates while the bus bars are so connected and subsequently severing said connecting portions whereby the elements are separated.

2. The process of assembling a series of storage battery elements comprising integrally connecting the element bus bars by bridging portions of conductive material of less cross section than the cross section of the bus bar and severing the bridging portions subsequent to the forming of the element plates in an electrolytic solution.

3. The process of assembling storage battery plates which includes the positioning of several groups of positive and negative plates in juxtaposition, autogenously welding a continuous bus bar to all of the positive plates in each group and autogenously welding a bus bar to all of the negative plates in each group with each bus bar having a weakened section disposed between each group of plates, electrolytically forming the plates while so connected and finally severing the said weakened sections of each bus bar whereby the several groups of positive and negative plates are separated into battery units or elements.

4. The steps in the process of assembling storage battery elements which includes the casting of connecting portions between the positive and negative element bus bars, whereby the positive plates and negative plates of each element are connected in series, forming the element plates in a suitable electrolytic solution while so connected and subsequently severing said connecting portions from the bus bars whereby the elements become separated.

5. The method of assembling a series of storage battery elements comprising integrally connecting the positive bus bars by bridging portions of conductive material of less cross section than that of the bus bars and similarly connecting the negative bus bars, electrolytically forming the elements while thus connected, and thereafter severing the bridging portions of the bus bars.

6. The process of assembling a group of storage battery elements which includes the casting or welding of connecting portions between the element bus bars, said connecting portions being of less cross section than the bus bar and being located adjacent the outer edge of the bar, electrically forming the element plates while the bus bars are so connected and subsequently severing said connecting portions whereby the elements are separated.

7. The process of assembling a group of storage battery elements which includes the casting or welding of connecting portions between the element bus bars, said connecting portion being offset beyond the edge of the bar forming the element plates in a suitable electrolytic solution while so connected and subsequently cutting said connecting portions from the bus bars whereby the elements are separated into individual battery units.

In testimony whereof, I hereunto affix my signature.

CLARENCE W. HAZELETT.